US011877233B1

(12) United States Patent
Bloechl (10) Patent No.: US 11,877,233 B1
(45) Date of Patent: Jan. 16, 2024

(54) REAL-TIME LOCATION SYSTEM FOR SELECTIVELY COORDINATING OPERATIVE WIRELESS COMMUNICATIONS PROTOCOLS WHEN RANGING BETWEEN SUPPORTING NODES

(71) Applicant: Link Labs, Inc., Annapolis, MD (US)

(72) Inventor: Mark O. Bloechl, Annapolis, MD (US)

(73) Assignee: Link Labs, Inc., Annapolis, MD (US)

( * ) Notice: Subject to any disclaimer, the term of this patent is extended or adjusted under 35 U.S.C. 154(b) by 0 days.

(21) Appl. No.: 18/125,407

(22) Filed: Mar. 23, 2023

(51) Int. Cl.
*H04W 4/00* (2018.01)
*H04W 48/16* (2009.01)
*H04W 48/20* (2009.01)
*G01S 5/14* (2006.01)

(52) U.S. Cl.
CPC .............. *H04W 48/16* (2013.01); *G01S 5/14* (2013.01); *H04W 48/20* (2013.01)

(58) Field of Classification Search
CPC ..... H04W 48/16; H04W 48/20; H04W 28/04; H04W 72/04; H04W 72/042; H04W 88/08; G01S 5/14; H04L 5/0007
USPC ......................................................... 370/329
See application file for complete search history.

(56) References Cited

U.S. PATENT DOCUMENTS

| 6,128,490 | A | 10/2000 | Shaheen et al. |
| 7,321,331 | B2 | 1/2008 | Andric et al. |
| 7,817,579 | B2 | 10/2010 | Ramirez et al. |
| 7,978,674 | B1 | 7/2011 | Oroskar et al. |
| 9,788,151 | B2 | 10/2017 | Duan et al. |
| 10,200,886 | B2 | 2/2019 | Duan et al. |
| 10,264,436 | B1 | 4/2019 | Wohler et al. |
| 10,408,917 | B2 | 9/2019 | Ye et al. |
| 10,444,321 | B2 | 10/2019 | Pu et al. |
| 10,708,970 | B2 | 7/2020 | Bloechl et al. |
| 10,779,118 | B2 | 9/2020 | Duan et al. |
| 10,845,451 | B1 | 11/2020 | Bloechl |
| 10,862,520 | B1 | 12/2020 | Bloechl |
| 11,200,805 | B2 | 12/2021 | Ye et al. |
| 11,259,143 | B2 | 2/2022 | Duan et al. |
| 11,259,144 | B2 | 2/2022 | Duan et al. |
| 11,470,448 | B2 | 10/2022 | Ye et al. |
| 11,519,999 | B2 | 12/2022 | Rybalko et al. |
| 2005/0288003 | A1 | 12/2005 | Matsumura |
| 2006/0160544 | A1 | 7/2006 | Sun et al. |
| 2008/0186231 | A1 | 8/2008 | Aljadeff et al. |
| 2012/0295623 | A1 | 11/2012 | Siomina et al. |
| 2019/0135229 | A1 | 5/2019 | Ledvina et al. |
| 2019/0174332 | A1 | 6/2019 | Duan et al. |
| 2020/0106877 | A1 | 4/2020 | Ledvina et al. |
| 2020/0382902 | A1 | 12/2020 | Ye et al. |

(Continued)

FOREIGN PATENT DOCUMENTS

WO 2022125393 A1 6/2022

*Primary Examiner* — Temica M Beamer
(74) *Attorney, Agent, or Firm* — Charles B. Lobsenz; Brian H. Buck; Potomac Law Group, PLLC (57) ABSTRACT

Provided are a system and method for selectively coordinating operations of wireless communications nodes according to a plurality of included wireless communications protocols. Such selective coordination encompasses transitioning transmit and receive windows to be operable according to a respective protocol depending upon the occurrence of a ranging operation, whereas the transitioning is targeted at conserving energy consumption.

20 Claims, 3 Drawing Sheets

(56) References Cited

U.S. PATENT DOCUMENTS

| | | |
|---|---|---|
| 2020/0404450 A1 | 12/2020 | Duan et al. |
| 2021/0027631 A1 | 1/2021 | Ye et al. |
| 2021/0029493 A1 | 1/2021 | Duan et al. |
| 2021/0029500 A1 | 1/2021 | Ye et al. |
| 2021/0105736 A1 | 4/2021 | Tancerel et al. |
| 2021/0158637 A1 | 5/2021 | Kincaid et al. |
| 2021/0282112 A1 | 9/2021 | Zhan |
| 2022/0011398 A1 | 1/2022 | Duan et al. |
| 2022/0013177 A1 | 1/2022 | Li et al. |
| 2022/0014875 A1 | 1/2022 | Rybalko et al. |
| 2022/0058950 A1 | 2/2022 | Ye et al. |
| 2022/0171012 A1 | 6/2022 | Duan et al. |
| 2022/0210620 A1 | 6/2022 | Wahl et al. |
| 2022/0268875 A1* | 8/2022 | Szebenyei ............... G01S 13/74 |
| 2022/0272488 A1 | 8/2022 | Pekhteryev et al. |
| 2022/0317235 A1 | 10/2022 | Ye et al. |
| 2022/0377752 A1 | 11/2022 | Zhbankov et al. |
| 2022/0386270 A1* | 12/2022 | Suresh ..................... G01S 5/04 |
| 2022/0390586 A1 | 12/2022 | Ye |
| 2022/0394660 A1* | 12/2022 | Werner ................. H04L 67/535 |
| 2023/0067130 A1 | 3/2023 | Duan et al. |
| 2023/0071850 A1 | 3/2023 | Ye et al. |
| 2023/0095932 A1 | 3/2023 | Ye et al. |
| 2023/0106904 A1 | 4/2023 | Ljung |
| 2023/0110357 A1 | 4/2023 | Kämäräinen et al. |
| 2023/0156424 A1 | 5/2023 | Lee et al. |

* cited by examiner

REAL-TIME LOCATION SYSTEM FOR SELECTIVELY COORDINATING OPERATIVE WIRELESS COMMUNICATIONS PROTOCOLS WHEN RANGING BETWEEN SUPPORTING NODES

FIELD OF THE DISCLOSURE

Disclosed embodiments relate to wireless communications systems and the operation thereof, and more specifically, to selectively coordinating alternating operability of system nodes according to differing communications protocols in order to optimize energy consumption when conducting ranging between the nodes.

BACKGROUND

Wireless communications protocols which are operative to enable the exchange of information between objects are varied in both their purposes and capabilities. Among such protocols are BLUETOOTH, BLUETOOTH LOW ENERGY (BLE), THREAD, and ULTRA-WIDEBAND (UWB). For instance, while BLE and UWB are uniquely attractive in providing ranging capability between such objects, each is differentiated by at least the accuracy with which a ranging solution is obtainable. In this regard, it is known that UWB ranging can be more refined than that which is available when employing BLE, e.g., centimeters versus meters. Applicability for such UWB ranging can be restrained, however, since battery-operated devices executing such ranging can experience significant power consumption due to the operative ranging topology as well as "line of sight" impediments that can inhibit a continuum of ranging operations.

Real-time location systems (RTLS) are known, and are often invaluable in providing the ability to track the whereabouts of any number of targeted objects. For example, such objects can include items which can be transitory in a manufacturing process or setting, and in other types of settings such as at a construction site. In some cases, RTLS have even been employed to monitor the positioning of persons whose incremental change in location it is essential to know. Examples of such essentiality can be manifest in a care-taking setting, such as an assisted living facility or hospital, as well as in a workplace where knowledge of an individual employee's placement can help guide scheduling and implementation of certain tasks.

Implementation of RTLS can be achieved by associating one or more "tags" with a given targeted object, where a respective tag can be in communication with one or several "beacons" so as to determine a relative distance therefrom. Based on the determined distance, a real-time location of the tag, and thus its associated object, can be ascertained.

In arriving at the determined distance, such RTLS can use signaling between tags and beacons that can be the basis for ranging implementing, for example, time of flight (TOF), e.g., two-way ranging (TWR), or time distance of arrival (TDOA) measurement techniques. As each of these techniques exact different power consumption on either an initially transmitting tag or beacon, emphasis on reducing that power consumption is always a focus. This is the case particularly since extension of longevity of battery operation of involved wireless devices can prolong their utility and thus their contribution to the tracking activities with which they are involved.

In today's times, various of the above-discussed wireless communication protocols can be singularly invoked to achieve such prolonged utility. Despite such singular invocation, however, various instances of RTLS can exact an undesirable level of power consumption. For instance, RTLS solely employing UWB and associated high bandwidth operations can expend unduly high amounts of current (i.e., reducing battery life) while enacting TWR due to a multitude of transmit and receive signaling.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments herein may include a system and commensurate method providing a real-time location system (RTLS), including at least one tag, and at least one beacon communicable with the at least one tag, wherein each of the at least one tag and the at least one beacon is equipped with at least first and second wireless communications protocols which are interchangeable by the at least one tag and the at least one beacon in a process of ranging between the at least one tag and the at least one beacon.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless dearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items, Only terms dearly indicated to the contrary, such as only one of or "exactly one of," or, when used in the claims, "consisting of," will refer to the inclusion of exactly one element of a number or list of elements. In general, the term "or" as used herein shall only be interpreted as indicating exclusive alternatives (Le, "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information, Examples of such networks include, PSTN, LAN, WAN, WiFi, LTE, CBRS, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

Bluetooth Low Energy (BLE) networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point, or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

As will be discussed, embodiments herein may encompass signaling on one or more devices equipped according to an "XLE" wireless communications protocol, wherein such protocol is a low energy consumption protocol such as BLE or THREAD, and otherwise a UWB protocol, or, for example, on a combination of such protocols relative to selective operations between system nodes (i.e., wireless communications nodes (WCNs)) that exchange such signaling.

Figure 1:
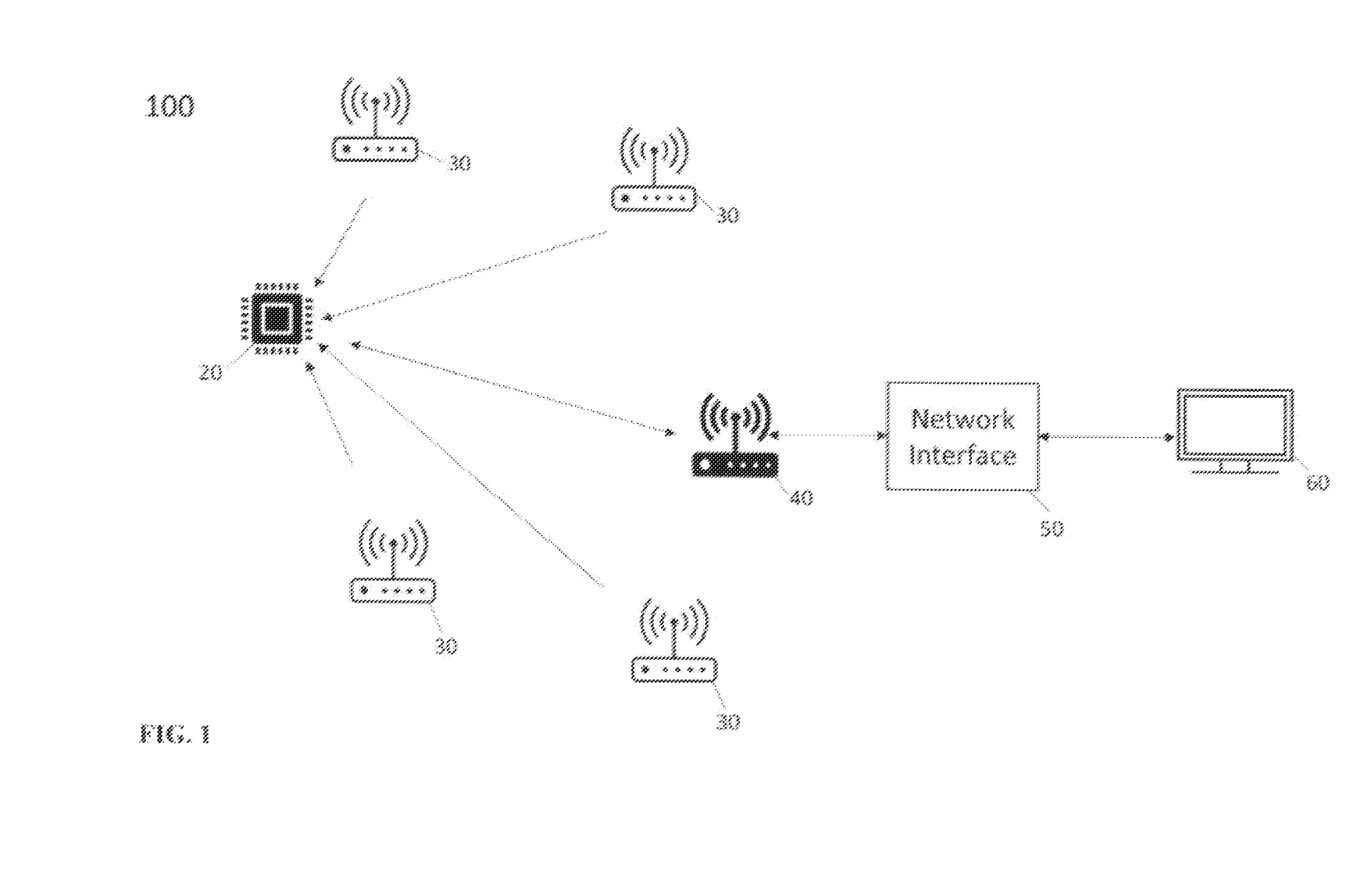
FIG. 1 is an illustration of a system providing wireless communications in accordance with embodiments herein.

Referring to FIG. 1, a description of a communications system 100 according to an embodiment is provided. System 100 and its components may each be configured to be operable in accordance with one or more of XLE and UWB protocols, such that each of the aforementioned components are configured for communications according to a selected one of such protocols at a first time and the other of such protocols at a second time. System 100 typically includes multiple tags 20—only one is shown in FIG. 1 for clarity. Tag 20 may be attached to or associated with a particular object for the purposes of tracking a changing location of that object. Tags 20 are capable of wirelessly communicating with other components of system 100 as more fully described herein. System 100 also includes a plurality of beacons 30 which also communicate wirelessly with other components of system 100 such as with tags 20. Beacons 30 are located at very specific geographic coordinates within the area within which objects are to be tracked. Beacons 30 are installed in these locations and during the time of installation, their specific locations are entered into system 100 so that system 100 is always aware of the known exact physical locations of each such beacon 30.

System 100 may also include one or more access points 40. These access points 40 may also serve in the same capacity as beacons 30 in that their location is known to system 100 and such that they may communicate with tags 20 as described herein for the purpose of location determination as more fully described herein. In addition, access points 40, if present, also provide a connection to network interface 50 which permits data to be shared with and received from other networks such as the internet. This functionality may alternatively be provided by one or more beacons 30 in lieu of access point 40. In one embodiment, data is transmitted and received via backhaul to the internet such that a cloud based application may be accessed by a user via client 60 to view object location information and also to allow the user to configure various aspects related to the functionality of system 100.

Tags 20 are responsible for executing any coordinate location determination process locally and then reporting the location determination to system 100 via a communication to an access point 40 (or a beacon 30y In an embodiment, each tag 20 may individually report such a corresponding location determination via its own respective backhaul. See, for example, U.S. Pat. No. 10,264,436 entitled, "BLE NETWORKING SYSTEMS AND METHODS PROVIDING CENTRAL AND PERIPHERAL ROLE REVERSAL WITH INDEPENDENT PERIPHERAL NETWORK CONNECTIVITY," which is commonly owned by the assignee of the present application and incorporated by reference herein.

In this regard, XLE communications between a tag 20 and a beacon 30 may occur according to a "role reversal" where the tag 20 is responsible for initiating a location determination, i.e., after first receiving a beacon advertisement that can be a trigger for the location determination process to begin at the tag 20. An exemplary discussion of one or more aspects which are descriptive of the reversal are provided in U.S. Pat. No. 10,708,970 entitled, "BLE NETWORKING SYSTEMS AND METHODS PROVIDING CENTRAL AND PERIPHERAL ROLE REVERSAL WITH ENHANCED PERIPHERAL LOCATION DETERMINATION USING CONSTANT TONE EXTENSION ANALYSIS FOR A SAME CHANNEL," which is commonly owned by the assignee of the present application and incorporated by reference herein. Analogously, a respective tag 20 and beacon 30 pair may, according to embodiments herein, execute such same role reversal so as to employ UWB communications.

Alternatively, at least one embodiment as discussed herein may contemplate one or more selective transitions between XLE and UWB protocol (along appropriate channels, i.e., channeling, thereof) as a process for location determination of a tag 20 occurs. In other words, such process may begin with communication initiated in accordance with XLE protocol according to the reversal explained above whereafter such communication is transitioned to UWB protocol selectively in accordance with one or more aspects of embodiments herein. Contrastingly, communications between a tag 20 and beacon 30 in at least one embodiment may occur in a "non-reversed" scenario such that one or more location determinations for a tag 20 are initiated by a beacon 30 in response to receipt of initial messaging by a tag 20.

Whether executing a role reversal as between a tag 20 and a beacon 30 or not, it is to be understood by one of ordinary skill in the art that each of the tag 20 and beacon 30 may be implemented by all appropriate software and/or hardware for carrying out location technologies included in the discussion herein, e.g., UWB protocol, phase ranging implementing XLE protocol according to the role reversal discussed herein, and proximity determination according to received signal strength (RSS) according to the role reversal discussed herein.

In a respective one of the role reversal and non-reversal scenarios discussed above, either a tag 20 or a beacon 30 is contemplated to first transmit certain information. Such certain information may include, as is appropriate, one or more parameters or variables that can establish certain access and ranging criteria that can be determinative of (i.e., trigger) which communication protocol, e.g., XLE or UWB, ought to be implemented when carrying out further communications between the tag 20 and the beacon 30. In some implementations, the trigger as to which protocol is controlling for such further communications may be further defined according to one or more user-implemented settings executed in accordance with software and/or hardware defining the tag 20 and/or the beacon 30. For instance and where location determination is initiated by a tag 20 according to the role reversal discussed herein, the availability of a sufficient number of beacons 30 operable according to a desired protocol may dictate user selectability of which protocol will be controlling for communications between the tag 20 and the beacon 30. As an example, calculations for which 3D estimation is desired necessitate the availability of four (4) beacons 30.

Where, for instance, communications between a tag 20 and a beacon 30 implement the role reversal according to either XLE or UWB protocol, such a beacon 30 may be configured to transmit one or more of access and ranging criteria with respect to a respective tag 20. That is, such criteria may be understood as one or more transmitted data, including the protocol in support of such transmission, that can enable communications between a respective tag 20 and a respective beacon to occur in order to determine a relative range therebetween. Among such criteria are, in addition to identification of the transmitting protocol, at least the following: (1) supported locationing capability, e.g., UWB, phase-based ranging, RSS proximity (see, for example, U.S. Pat. No. 10,845,451 entitled "APPARATUS AND METHOD FOR MITIGATING INTERFERENCE WHEN PHASE RANGING AMONG BEACONS AND TAGS," which is commonly owned by the assignee of the present application and incorporated by reference herein); (2) positional information of the beacon 30 including its x, y, z, coordinate location in a 3D space (see U.S. Pat. No. 10,862,520 entitled, "APPARATUS AND METHOD FOR MITIGATING EFFECTS OF MULTIPATH INTERFERENCE BETWEEN WIRELESS COMMUNICATION NODES VIA CONSTRAINT OF ESTIMATED NODE LOCATION," which is commonly owned by the assignee of the present application and incorporated by reference herein); (3) relative threshold limits on potential, i.e., obtainability, for positional accuracy within a predetermined distance that define distances within which accuracy of locationing is not achievable (see U.S. Pat. No. 10,862,520 entitled, "APPARATUS AND METHOD FOR MITIGATING EFFECTS OF MULTIPATH INTERFERENCE BETWEEN WIRELESS COMMUNICATION NODES VIA CONSTRAINT OF ESTIMATED NODE LOCATION," which is commonly owned by the assignee of the present application and incorporated by reference herein); and (4) restriction on location inclusion, where a beacon 30 can preset its RSS to a predetermined threshold determinative of whether a tag 20 may include or exclude such a beacon 30 in a relative location determination of that tag 20.

Thus, as will be understood from the above, one or more of criteria (1)-(4) together with whether a tag 20 and/or beacon 30 each support XLE and/or UWB protocol can define access and ranging criteria that such a tag 20 can evaluate when making a determination as to whether a given beacon 30 is selectable by the tag 20 to establish a relative range. For instance, such a tag 20 can evaluate whether an advertisement received from a beacon 30 is transmitted according to a protocol matching a capability of the tag 20 to communicate according to that protocol so as to satisfy access and ranging capability for the tag 20.

Figure 2:
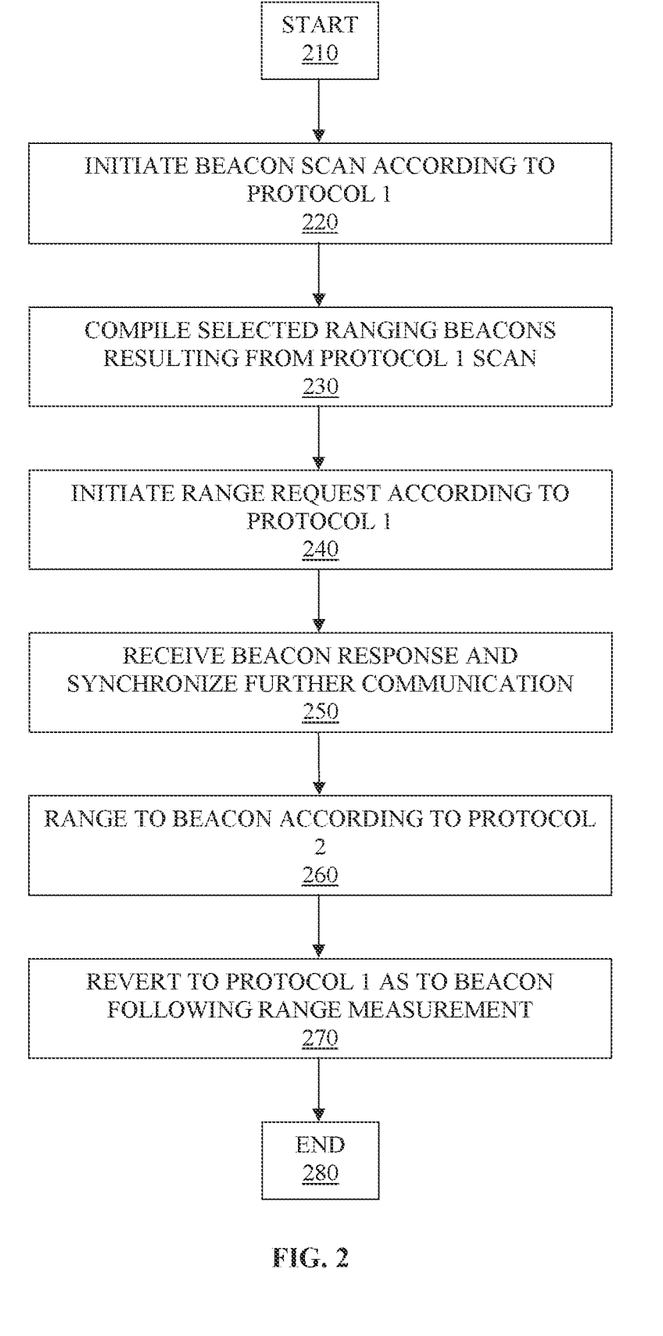
FIG. 2 is a sequence diagram illustrating a manner of selectively coordinating wireless communications in accordance with the system of FIG. 1.

Referring to FIG. 2, there is illustrated interchangeability of an exemplary communications protocol selection that may be implemented by a tag 20, as discussed herein, wherein role reversal among the tag 20 and a communicative beacon 30 is cant oiling. In other words, such a beacon 30 may initially transmit advertisements for detection by the tag 20 along a XLE channel, i.e., a first channel, as opposed to an available UWB channel, i.e., a second channel, so as to avoid "line of sight" restrictions normally associated with UWB communications and to minimize energy consumption in accordance with BLE protocol. As mentioned above, one or more of such advertisements may include one or more of access and ranging criteria (1)-(4) as a well as a flag indicative of the XLE transmission. Thus, for all sequencing therein from the perspective of the tag 20 and beginning at 210, the tag 20 initiates, at 220, a beacon scan according to the XLE protocol, i.e., protocol 1. In this way, though both of the tag 20 and the beacon 30 are equipped with XLE and UWB radios, embodiments herein initiate such scan according to XLE protocol so as to conserve battery consumption. At 230, tag 20 may compile selected ranging beacons 30 resulting from the beacon scan according to protocol 1. Here, it is contemplated that such selection of beacons 30 may be in accordance with U.S. Pat. No. 10,887,860 entitled, "APPARATUS AND METHOD FOR OPTIMIZING WIRELESS END NODE LOCATION DETERMINATION VIA TARGETED PROXIMITY RANGING TO CLUSTERS OF OTHER WIRELESS NODES," which is commonly owned by the assignee of the present application and incorporated by reference herein. In particular, such selection may be in accordance with FIG. 11 thereof, et seq. Once having determined such ranging beacons 30, tag 20 can then initiate, at 240, a range request according to the implemented XLE protocol. In this regard, such request may include a demand that ranging occur according to UWB protocol, i.e., protocol 2, on each of the tag 20 and the beacon 30. In response, tag 20, at 250, may, relative to the request for ranging, receive the beacon 30 response whereby such response concomitantly serves to synchronize further tag 20/beacon 30 communications (e.g., windowing, transmit/receive timing, etc.). Now synchronized, tag 20 can further initiate, at 260, TWR with selected beacons 30 according to a UWB protocol defining each of the tag 20 and the beacons 30. In this way, transmit and receive windows for each of the nodes may be operable for these discrete corresponding time periods according to only protocol 2 so as to capture information necessary to evaluate corresponding ranging data according to UWB TWR. Once such information is captured enabling ranging operations to be completed, tag 20 can, at 270, revert to protocol 1, thereby exiting UWB TWR operations, prior to ending a communications cycle with one or more relevant beacons 30 at 280.

Figure 3:
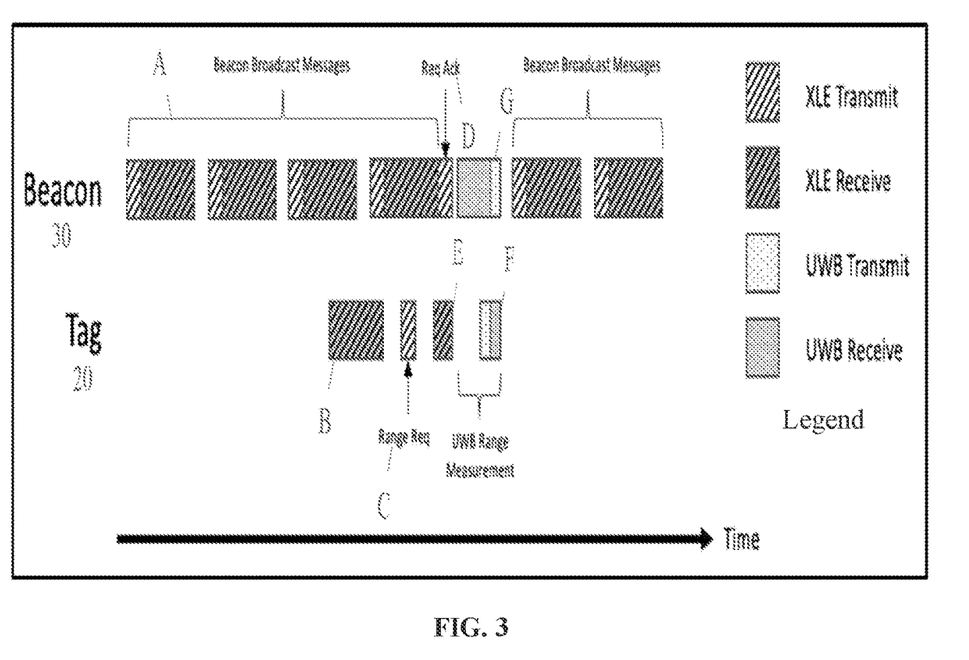
FIG. 3 is a schematic diagram illustrating the selective coordination of wireless communications in accordance with the sequencing of FIG. 2.

Referring to FIG. 3, there is provided a schematic diagram illustrating the selective coordination of wireless communications in accordance with the sequencing of FIG. 2. In particular, FIG. 3 provides a diagrammatic explanation of the series of events that can occur when an exemplary tag 20 and beacon 30, each of which is equipped with both a XLE and UWB radio, are configured to selectively coordinate XLE and UWB communications when determining ranging. In this regard, one of ordinary skill in the art will realize that, in conventional UWB systems, such coordination in either a corresponding tag or beacon (i.e., "anchor") is absent, whereas UWB channeling must be used in both scanning and ranging operations. As a result, commensurate energy resources must be expended. In embodiments disclosed herein, however, such expenditure can be altered by the selective coordination and distribution of communication tasks according to both XLE and UWB protocol. In this way, energy consumption at both the tag 20 and a communicative beacon 30 can be reduced.

Supporting communications between the tag 20 and such a beacon 30 are provided, therefore, with the initial transmission of broadcast messages ("advertisements") at "A" according to XLE protocol and received at "B" by the tag 20 which regularly scans using its XLE radio. It is to be understood that with respect to all operations discussed herein with reference to FIGS. 2 and 3, each of the tag 20 and the beacon 30 may be implemented by all appropriate software and/or hardware for carrying out applicable location technologies as are discussed with respect to the Figures. As a result of the scanning, the tag 20 can, with respect to targeted beacons 30 (only one of which is shown for simplicity), initiate a range request at "C." Still operating according to XLE protocol, the beacon 30 issues an acknowledgement of the range request at "D" serving to synchronize further communications. By virtue of the acknowledgement (received by the tag 20 at "E"), embodiments herein contemplate at least two energy conserving parameters that define the synchronization, and namely, (1) that a range measurement, according to UWB protocol, occur immediately upon initiation thereof by the tag 20 (as at "F") and relative to the beacon 30 (as at "G"), and (2) that upon conclusion of the ranging, each of the tag 20 and the beacon 30 immediately revert their respective radios to XLE protocol. That is, once UWB TWR polling and response between the tag 20 and the beacon 30 are concluded, each respective UWB radio is placed in its sleep state until further ranging is appropriate (see an upcoming series of beacon broadcast messages, as depicted in FIG. 3). Through setting of at least the above parameters, it can be understood that embodiments discussed herein minimize hardware power usage drawing on available energy such as from a battery that may enable operations of one or more of the above exemplary tag 20 and beacon 30. In this way, the present embodiments advantageously facilitate extended service life and reliability of such communications nodes in support of tasks associated with corresponding RTLS.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A real-time location system (RTLS), comprising:
at least one tag; and
at least one beacon communicable with the at least one tag,
wherein
each of the at least one tag and the at least one beacon is equipped with at least first and second wireless communications protocols which are interchangeable by the at least one tag and the at least one beacon in a process of ranging between the at least one tag and the at least one beacon, and
wherein, in response to the at least one tag and the at least one beacon engaging in the process of ranging, the at least one tag and the at least one beacon conduct ranging communications for a ranging measurement of the process of ranging according to the at least a second wireless communications protocol, and upon conclusion of the ranging measurement, the at least one tag and the at least one beacon immediately revert to operability on only the at least a first wireless communications protocol.

2. The RTLS of claim 1, wherein:
the interchangeability of the at least first and second wireless communications protocols comprises transmitting, by the at least one beacon, one or more broadcast messages according to the at least a first wireless communications protocol.

3. The RTLS of claim 2, wherein:
the interchangeability of the at least first and second wireless communications protocols comprises receiving, by the at least one tag, the one or more broadcast messages according to the at least a first wireless communications protocol.

4. The RTLS of claim 3, wherein:
the interchangeability of the at least first and second wireless communications protocols comprises the at least one tag initiating a request for ranging with the at least one beacon according to the at least a first wireless communications protocol.

5. The RTLS of claim 4, wherein:
the interchangeability of the at least first and second wireless communications protocols comprises the at least one beacon acknowledging the request for ranging according to the at least a first wireless communications protocol.

6. The RTLS of claim 5, wherein:
the at least one beacon acknowledgement comprises a synchronization including parameters controlling further communications between the at least one tag and the at least one beacon.

7. The RTLS of claim 6, wherein:
at least one of the parameters comprises that any range measurement between the at least one tag and the at least one beacon be carried out according to the at least a second wireless communications protocol.

8. The RTLS of claim 7, wherein:
at least one of the parameters comprises that, upon conclusion of any range measurement between the at least one tag and the least one beacon, the at least one tag and the at least one beacon revert to communications therebetween according to the at least a first wireless communications protocol.

9. The RTLS of claim 1, wherein:
the at least a first wireless communications protocol comprises BLUETOOTH LOW ENERGY (BLE).

10. The RTLS of claim 9, wherein:
the at a second wireless communications protocol comprises ULTRA-WIDEBAND (UWB).

11. A method of determining a tag location according to a real-time location system (TUTS), the method comprising:
providing at least one tag; and
providing at least one beacon communicable with the at least one tag,
wherein
each of the at least one tag and the at least one beacon is equipped with at least first and second wireless communications protocols which are interchangeable by the at least one tag and the at least one beacon in a process of ranging between the at least one tag and the at least one beacon, and
wherein, in response to the at least one tag and the at least one beacon engaging in the process of ranging, the at least one tag and the at least one beacon conduct ranging communications for a ranging measurement of the process of ranging according to the at least a second wireless communications protocol, and upon conclusion of the ranging measurement, the at least one tag and the at least one beacon immediately revert to operability on only the at least a first wireless communications protocol.

12. The method of claim 11, wherein:
the interchangeability of the at least first and second wireless communications protocols comprises transmitting, by the at least one beacon, one or more broadcast messages according to the at least a first wireless communications protocol.

13. The method of claim 12, wherein:
the interchangeability of the at least first and second wireless communications protocols comprises receiving, by the at least one tag, the one or more broadcast messages according to the at least a first wireless communications protocol.

14. The method of claim 13, wherein:
the interchangeability of the at least first and second wireless communications protocols comprises the at least one tag initiating a request for ranging with the at least one beacon according to the at least a first wireless communications protocol.

15. The method of claim 14, wherein:
the interchangeability of the at least first and second wireless communications protocols comprises the at least one beacon acknowledging the request for ranging according to the at least a first wireless communications protocol.

16. The method of claim 15, wherein:
the at least one beacon acknowledgement comprises a synchronization including parameters controlling further communications between the at least one tag and the at least one beacon.

17. The method of claim 16, wherein:
at least one of the parameters comprises that any range measurement between the at least one tag and the at least one beacon be carried out according to the at least a second wireless communications protocol.

18. The method of claim 17, wherein:
at least one of the parameters comprises that, upon conclusion of any range measurement between the at least one tag and the least one beacon, the at least one tag and the at least one beacon revert to communications therebetween according to the at least a first wireless communications protocol.

19. The method of claim 11, wherein:
the at least a first wireless communications protocol comprises BLUETOOTH LOW ENERGY (BLE).

20. The method of claim 19, wherein:
the at a second wireless communications protocol comprises ULTRA-WIDEBAND (UWB).

* * * * *